Jan. 12, 1932.  W. R. BONHAM  1,840,806
SPEED INDICATOR
Filed Sept. 11, 1929  3 Sheets-Sheet 2
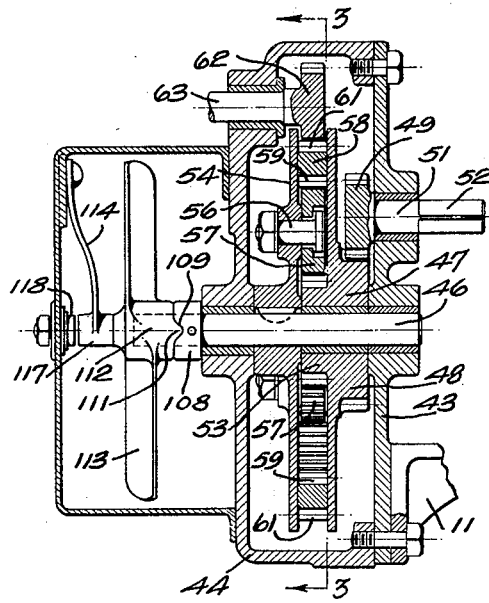
FIG_2_
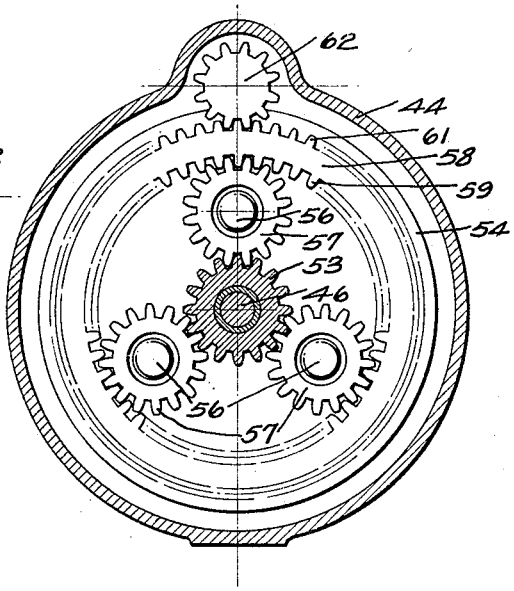
FIG_3_
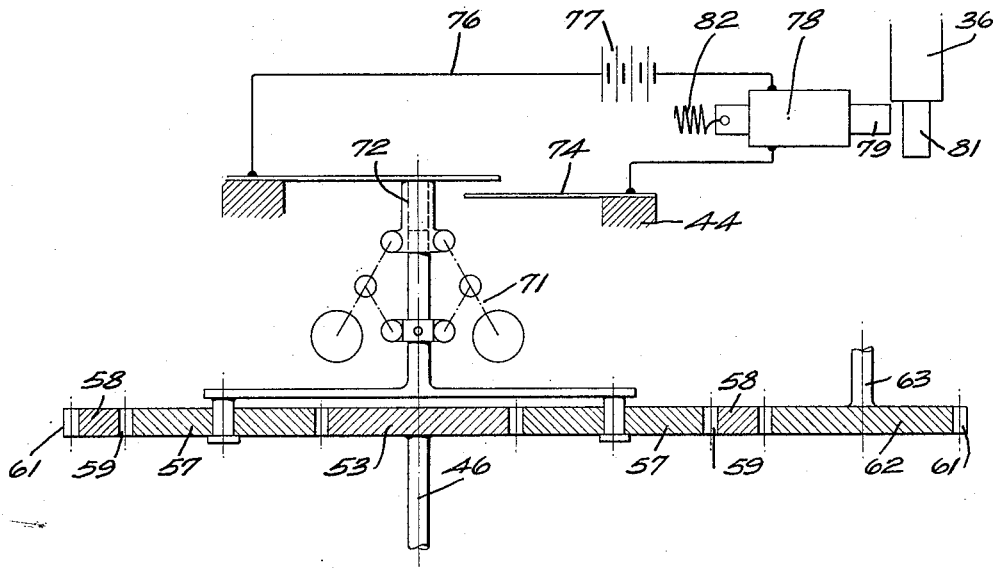
FIG_4_
INVENTOR.
Walter R. Bonham
BY White, Prost, Flehr & Lothrop
ATTORNEYS.

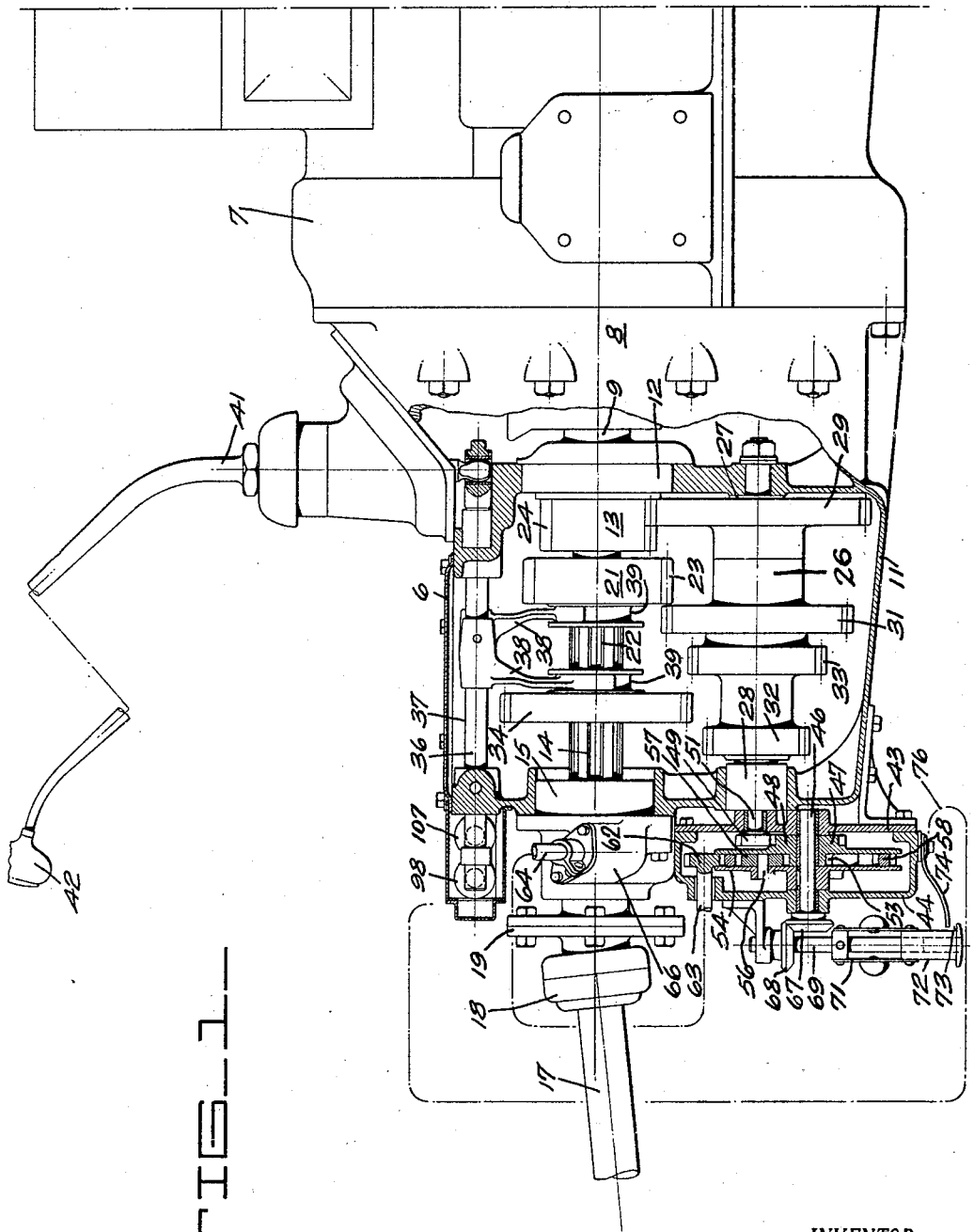

Jan. 12, 1932.  W. R. BONHAM  1,840,806
SPEED INDICATOR
Filed Sept. 11, 1929  3 Sheets-Sheet 3
FIG_5_
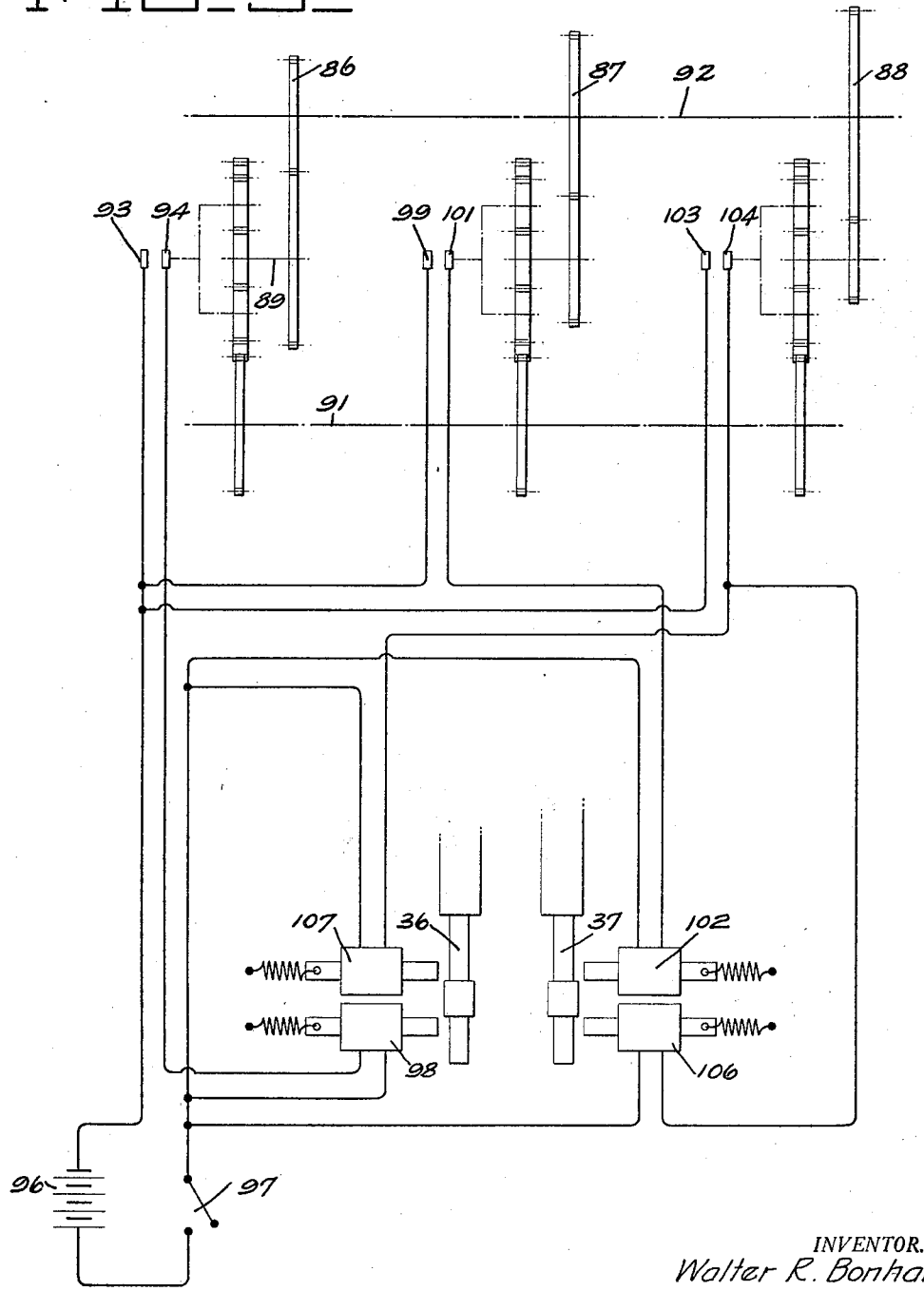
INVENTOR.
Walter R. Bonham
BY
White, Prost, Flehr Lothrop
ATTORNEYS.

Patented Jan. 12, 1932                                        1,840,806

UNITED STATES PATENT OFFICE

WALTER R. BONHAM, OF PALO ALTO, CALIFORNIA

SPEED INDICATOR

Application filed September 11, 1929. Serial No. 391,948.

My invention relates to means responsive to variations from a predetermined speed ratio between a pair of shafts and is particularly useful in connection with sliding gear transmissions such as are at present utilized in automobiles.

An object of my invention is to facilitate gear shifting in sliding gear transmissions.

Another object of my invention is to prevent the shifting of gears in a sliding transmission when the speed ratio between the two shafts to be engaged is improper.

The foregoing and other objects are attained in the embodiment of the invention shown in the drawings, in which Fig. 1 is a cross section on a longitudinal vertical plane of a change speed or sliding gear transmission as it is employed in an automobile.

Fig. 2 is an enlarged detail showing the speed ratio responsive unit of my invention.

Fig. 3 is a cross section on the line 3—3 of Fig. 2.

Fig. 4 is a diagram showing the electrical connections utilized in conjunction with the speed ratio responsive device.

Fig. 5 is a diagrammatic showing of the speed indicator of my invention as it is applied to the usual sliding gear transmissions utilized in automobiles.

In its preferred form, the speed indicator of my invention comprises means responsive to variations from a predetermined ratio of speed between two shafts to prevent the meshing of gears mounted upon said shafts.

While the device of my invention is well applicable to any condition in which two revolving units vary in operation from a predetermined speed ratio and are intended to be engaged or disengaged approximately at said speed ratio, I find a particular field of use on automobiles. In most such vehicles a sliding gear transmission is employed which ordinarily is of the type shown in Fig. 1.

The transmission, generally designated 6, is usually joined to an internal combustion engine 7 by a bell housing 8. Power from the engine is usually transmitted to a shaft 9 through an engageable and disengageable clutch, not shown, usually located within the bell housing. A transmission housing 11 is provided with a bearing 12 for supporting the clutch shaft 9. Within the transmission housing and secured to the shaft 9 is a third-speed gear 13. This gear is not axially movable and preferably is interiorly formed with a journal for a main shaft 14. The other end of the main shaft is preferably carried in a bearing 15 in the transmission housing 11. A propeller shaft 17 connects through a universal joint 18 and companion flanges 19 to the main shaft 14 so that they all turn in unison. Due to the fact that the main shaft 14 and the shaft 9 are not directly connected, although they revolve about the same axis, there is no necessary correspondence between the speed of rotation of the main shaft 14 and the shaft 9.

In order to couple the main shaft with the shaft 9, a second-speed gear 21 is slidable on splines 22 formed on the main shaft 14. The second-speed gear is provided with external teeth 23 and also with internal teeth, not shown, adapted to engage external teeth 24 on the gear 13. The second-speed gear 21 is capable of axial translation along the splines 22 and can be telescoped with the gear 13 to lock the shafts 14 and 9 together for rotation in unison.

To provide means for varying the speed ratio between the shafts 9 and 14, I preferably provide a counter shaft 26 which is mounted on bearings 27 and 28 supported in the transmission case 11. At the forward end of the counter shaft is a gear 29, fixed to revolve with the counter shaft and to mesh with the gear 13. During the rotation of the shaft 9 the counter shaft 26 is also rotated at a fixed and predetermined speed ratio thereto. Also mounted on the counter shaft 26 is an intermediate gear 31 which is affixed to the counter shaft and turns in unison therewith. The pitch diameter of gear 31 is such that it can be engaged by the external teeth 23 on the sliding second-speed gear 21. The gear 21 thus has three major axial positions, one, as described, telescoped with gear 13 and another in mesh with the gear 31. Between these two positions the gear 21 runs idly.

To afford further variations of the speed ratio between shaft 9 and main shaft 14 I provide on the counter shaft two additional gears 32 and 33 of different diameters. Adapted to mesh directly with gear 33 is a first-speed gear 34 slidable upon splines 22 of main shaft 14. The gear 34 has gear teeth on its periphery so that when the gear is axially translated the teeth mesh directly with gear 33. When gear 34 is translated in the other axial direction the gear teeth thereof mesh through an idler, not shown, with the gear 32. This latter engagement affords a reversal in direction of relative rotation between shafts 9 and 14. Between the two extreme axial positions the gear 34 has an intermediate position in which it runs idly.

For translating the gears 21 and 34 axially to provide the various speed ratios, I preferably afford a pair of shifting rods 36 and 37 mounted to slide axially in the upper portion of the transmission housing 11. Each of these shifting rods carries a shifting fork 38 respectively engageable in collars 39 formed integrally with the gears 34 and 21. The shifting rods 36 and 37 are controllable individually but not simultaneously by a shifting lever 41 mounted adjacent the transmission housing 11 and carrying a ball 42 for convenient manipulation by an operator.

The transmission as shown in Fig. 1 is in neutral position in which no power is transmitted from shaft 9 to shaft 14 or to shaft 17. Upon disengagement of the clutch, not shown, the shaft 9 ceases revolving and upon proper manipulation of the ball 42, the gear 34 can be translated axially forward into mesh with the gear 33. Power is then transmitted from shaft 9 through gears 13 and 29 to gears 33 and 34 and thence through shaft 14 and joint 18 to shaft 17. This affords the first-speed position of the gears.

When the ball 42 is manipulated first to disengage gear 34 from gear 33 thus returning the transmission to neutral position, and the other shifting fork 38 is operated to translate the gear 21 axially into engagement with the gear 31, the power is then transmitted through gear 13 to gear 29 on the counter shaft 26 and thence through gear 31 to gear 21 and thus to the main shaft 14. This is the so-called second-speed position of the transmission.

Again, if gear 21 be returned to its neutral position and then additionally translated axially until it telescopes over gear 13, the drive is directly transmitted from shaft 9 through gear 13 to gear 21 and thus to the main shaft 14 which in turn revolves shaft 17. This is the high-speed of the transmission.

The other possible variation is, after the transmission has been returned to neutral position, to translate the gear 34 axially into engagement with the idler, not shown, so that the power is transmitted from gear 13 through gear 29 to the counter shaft 26 and thence through gear 32 to the idler and finally to gear 34 and the main shaft 14. This is the reverse position of the transmission.

In every case it is customary to disengage the clutch during any change in the speed ratio between shafts 9 and 14. Since these shafts ordinarily operate at various predetermined ratios when in one speed position and must quickly change to another predetermined speed ratio for another speed position it is sometimes practically impossible and is often difficult to mesh the mating gears properly. This gives rise to considerable wear and noise and furthermore makes quite difficult the manipulation of the ball 42 by the vehicle operator.

In order to prevent the engagement or meshing of the various mating gears unless they are revolving at their respective predetermined speed ratios I provide a mechanism which is responsive to variations from such predetermined speed ratios to lock the mechanism so that the gears cannot be engaged. Preferably secured to the transmission casing 11 is a housing 43 enclosed by a cover 44. Journalled in the housing 43 and the cover 44 I preferably mount a through shaft 46, which carries a plate 47. On one side the plate 47 is provided with an integral gear 48 with which meshes a gear 49 cut at the extremity of a stub shaft 51. Preferably the end of the stub shaft is squared, as at 52, and is socketed within one end of the counter shaft 26 so that the stub shaft and the counter shaft turn in unison. Since the plate 47 is geared to the stub shaft it also turns in unison with the counter shaft. On the other side of the plate 47 I provide a gear 53 which forms the sun gear of a planetary train. Mounted fixedly on shaft 46 is a plate 54 which carries at equally spaced intervals a plurality of studs 56 forming the rotational axes of planet gears 57 which mesh with the gear 53. Engaging all of the planet gears 57 and confined between the two plates 47 and 54 is a ring gear 58 having gear teeth 59 on its inner periphery to mesh with the planet gears and also carrying teeth 61 about its outer periphery to mesh with a drive gear 62 carried on a shaft 63 journalled in and projecting from the cover 44.

It will be appreciated that if a predetermined speed ratio exists between the sun gear 53, which is driven from the counter shaft 26, and the ring gear 58, which is driven from stub shaft 63, the planet gears 57 will simply revolve about their respective axes and will have no effect to revolve the plate 54 and in conjunction therewith the shaft 46. If, however, there are variations of the speed ratio between the counter shaft 26 and the stub shaft 63, the planet gears will be effective to revolve the plate 54 about its rotational axis at a speed corresponding to the magnitude of the variation and corresponding to the direction of the variation from the predetermined ratio therebetween. It is thus that the variations from the predetermined speed ratio cause corresponding and proportional rotation of the shaft 46.

Since it is variation from the predetermined ratio of speed between the main shaft and the counter shaft 26 that I desire to utilize in operating the gear latching mechanism of my device, I preferably connect the stub shaft 63 with the main shaft 14 by any suitable means, such as a flexible shaft 64 and gearing, not shown, contained in a housing 66. By this train of mechanism, the shaft 46 is responsive to variations from a predetermined ratio of speed between the main shaft 14 and the counter shaft 26. When the gear 21 meshes with the gear 13, there is a predetermined speed ratio between the shaft 9 and the shaft 14, and as well a predetermined ratio between the shaft 26 and the shaft 14. Since any variation from this ratio can by proper proportioning of the mechanism be made effective to revolve the shaft 46, I preferably provide means responsive to the rotation of shaft 46 for preventing the engagement of gear 21 with gear 13 when variations from such predetermined ratio exist.

As particularly shown in Fig. 1, the shaft 46 carries a bevel gear 67 at its extremity. Meshing with the gear 67 is a comparable bevel 68 turning a shaft 69 in unison with shaft 46. A governor 71 is secured to shaft 69 and is responsive to the speed thereof. When the shaft is stationary the governor is in the position shown in Fig. 1, while when the shaft acquires speed the governor weights, due to centrifugal force, lift the sleeve 72 axially along the shaft 69. The sleeve is preferably designed to abut a contact 73 which is mounted on a resilient support 74 secured to the case 44. When the sleeve is axially translated on the shaft 69 in response to rotation of shaft 46, the electrical circuit is closed, and since the electrical system is preferably grounded, the sleeve 72 when in abutment with the contact 73 completes an electrical circuit.

I preferably utilize such electrical variations for operating a latching mechanism. A wire 76 is preferably in circuit with a battery 77 in the customary fashion and conducts electrical energy, when the circuit is closed, to a solenoid 78. This scheme is diagrammatically illustrated in Figs. 1 and 4. Preferably the solenoid is effective upon a plunger 79 which can be propelled when the circuit and solenoid are energized into the path of one of the shift rods 36 or 37 to prevent the movement thereof in one direction. A reduced portion 81 on the shift rods 36 or 37 permits movement thereof in the opposite direction, however. A spring 82 normally retracts the plunger 79 from the path of the shift rod when the circuit is not energized.

As so far described, the device of my invention is applicable to prevent the gear lever 41 being moved to mesh one pair of gears unless that particular pair of gears is moving at the proper speed ratio. Any variation from the proper ratio will cause rotation of the shaft 46, energization of the electric circuit and movement of the solenoid plunger 79 into the path of the shifting rod so that meshing of the respective gears is prevented. If, however, the gears are revolving at the proper speed ratio the shaft 46 is stationary, the electric circuit is opened and the plunger 79 is retracted from the path of the shifting rod 36 to permit the gears to be meshed.

Although the scheme outlined is suitable for a large number of practical cases it may sometimes be desired to incorporate it with the transmission such as that described so that none of the gears can be meshed unless the proper ratio of speed between the shafts to be coupled is maintained. In this case I preferably multiply the number of units in accordance with the diagrammatic showing of Fig. 5. It will be observed that I provide separate planetary units 86, 87 and 88 for each of the three forward speeds. These units are practically identical but for the gear reduction between their center shaft 89 and the main drive shaft 91 which is operated from the transmission counter shaft as previously described. In a similar manner the ring gears of each of the units are driven at the proper speed by a shaft 92 actuated from the main shaft 14 of the transmission in the manner which has already been outlined.

Each of the planetary units is provided with a pair of contacts. The contacts are usually actuated through governors as previously mentioned. Unit 86 is provided with contacts 93 and 94 which close a circuit through the battery 96 and main switch 97, which may be operated coincidentally with the ignition switch of the vehicle, to energize a solenoid 98 for the low or first-speed position. Similarly the unit 87 is provided with contacts 99 and 101 which close a circuit through the battery 96 and main switch 97 to energize a solenoid 102 for the second-speed position. In a comparable fashion contacts 103 and 104 are provided in unit 88 to close a circuit through the battery 96 and the switch 97 to energize a solenoid 106 regulating the shifting of gears into the high-speed position. I have also found it expedient to place in parallel with the high-speed circuit a solenoid 107 for latching the reverse speed position. It will be observed that with the arrangement employed, the gear lever 41 cannot be operated to engage or mesh the gears unless the proper and respective predetermined ratio of speed obtains between the two associated shafts. It is possible, however, to remove from mesh any of the gears at any time and return them to neutral position but it is impossible to re-engage them unless suitable speed ratios obtain.

Although any suitable governor can be employed, I have found it expedient to utilize the form shown in Fig. 2 in which the shaft 46 carries fixedly therewith a collar 108 provided with a radial groove 109. Coacting with the groove is a projection 111 on a comparable collar 112 slidable on the shaft 46 and rotatable with respect thereto. Secured to the collar 112 is a fan 113 rotatable in conjunction with the shaft 46. A leaf spring 114 urges the collar 112 and collar 108 into engagement. The fan 113, when rotated, offers increasing resistance to increasing speed of rotation so that at a predetermined speed the collar 112 is rotated with respect to the collar 108 and the fan 113 is axially translated along the shaft 46. A contact 117 on the leaf spring 114 is thus forced into abutment with a contact 118 in the electrical circuit so that at all speeds of rotation in excess of a low minimum speed of rotation the electrical circuit is closed. When the shaft 46 approximates a stationary condition the electrical circuit is opened permitting the shift to be made.

It will be appreciated that in all forms of my invention I have provided means responsive to variations from a predetermined speed ration between a pair of shafts for preventing the engagement of gears mounted on such shafts and also for permitting such engagement when the ratio of speeds therebetween is approximately attained. The employment of the device of my invention facilitates materially the shifting of gears in a vehicle such as an automobile, prevents clashing, and thus obviates the resulting noise and wear.

It is to be understood that I do not limit myself to the form of the speed indicator shown and described herein, as the invention, as set forth in the following claims may be embodied in a plurality of forms.

I claim:

1. A speed indicator for a transmission comprising a main shaft, a counter shaft, a gear on one of said shafts, a second gear slidable on the other of said shafts to mesh with said first gear, a governor, means responsive to variations from a predetermined speed ratio between said main shaft and said counter shaft for operating said governor, means for sliding said second gear into mesh with said first gear, a latch adapted to be moved into a position to prevent the operation of said sliding means, a solenoid for actuating said latch, an electric circuit including said solenoid, and contacts controlled by said governor for closing said circuit to energize said solenoid and move said latch into said position.

2. A speed indicator for a transmission housing comprising a main shaft, a counter shaft, means for establishing various predetermined speed ratios between said shafts; said means including a plurality of gears on one of said shafts and a second plurality of gears on the other of said shafts; means for conditioning said gears for rotating said shafts, a latch adapted to be moved into position to prevent the operation of said last named means, a third shaft geared to said main and counter shafts; said third shaft being adapted to be maintained substantially at rest at said predetermined speed ratios and to be rotated upon variations from said predetermined speed ratio, a governor actuated by the rotation of said third shaft, and means controlled by said governor for moving said latch into said position.

3. A speed indicator for a transmission housing comprising a main shaft, a counter shaft, variable speed gearing on said shaft adapted to be conditioned for rotating said shafts at different predetermined speed ratios, a latch adapted to be moved into position to prevent the conditioning of said gearing, and means for moving said latch into said position; said means including a third shaft adapted to be rotated by said main and counter shafts upon variations from said predetermined speed ratios, a governor controlled by the rotation of said third shaft, a solenoid, an electric circuit including said solenoid, and contacts controlled by said governor for closing said circuit to energize said solenoid to move said latch into said position.

4. A speed indicator for a transmission housing comprising a main shaft, a counter shaft, a third shaft adapted to be rotated upon variations from predetermined speed ratios between said main and said counter shafts, variable speed gearing on said main and counter shafts adapted to be conditioned for rotating said shafts at predetermined speed ratios, a latch adapted to be moved into position to prevent the conditioning of said gearing, and means controlled by the rotation of said third shaft to move said latch into said position.

In testimony whereof, I have hereunto set my hand.

WALTER R. BONHAM.